United States Patent [19]
Krishnan

[11] Patent Number: 6,157,950
[45] Date of Patent: Dec. 5, 2000

[54] METHODS AND APPARATUS FOR INTERFACING A COMPUTER OR SMALL NETWORK TO A WIDE AREA NETWORK SUCH AS THE INTERNET

[75] Inventor: Kalyan Krishnan, Fremont, Calif.

[73] Assignee: Encanto Networks, Inc., Santa Clara, Calif.

[21] Appl. No.: 08/985,768

[22] Filed: Dec. 5, 1997

[51] Int. Cl.[7] .................................. G06F 15/173
[52] U.S. Cl. ................ 709/223; 709/245; 709/246; 709/276
[58] Field of Search .................. 709/246, 245, 709/249, 223; 395/200.76, 200.75, 200.79

[56] References Cited

U.S. PATENT DOCUMENTS

| | | | |
|---|---|---|---|
| 4,627,052 | 12/1986 | Hoare et al. | 370/88 |
| 5,142,622 | 8/1992 | Owens | 709/246 |
| 5,371,852 | 12/1994 | Attanasio et al. | 709/246 |
| 5,490,252 | 2/1996 | Macera et al. | 709/246 |
| 5,517,618 | 5/1996 | Wada et al. | 709/246 |
| 5,598,536 | 1/1997 | Slaughter, III et al. | 395/200.16 |
| 5,758,194 | 5/1998 | Kuzma | 709/231 |
| 5,845,079 | 12/1998 | Wada et al. | 709/246 |

OTHER PUBLICATIONS

Information Sciences Institute, University of Southern California, "Internet Protocol, DARPA Internet Program, Protocol Specification", Sep. 1981.

Primary Examiner—Mark H. Rinehart
Assistant Examiner—Ivan C. Pierce, III
Attorney, Agent, or Firm—Blakely, Sokoloff, Taylor & Zafman LLP.

[57] ABSTRACT

Methods and apparatus are provided for coupling a single computer, or small network of computers, and associated peripheral devices, to a wide area network, such as the Internet. The apparatus enables the devices to share a one or more IP addresses. The apparatus further enables remote access to the associated peripheral devices.

22 Claims, 6 Drawing Sheets

METHODS AND APPARATUS FOR INTERFACING A COMPUTER OR SMALL NETWORK TO A WIDE AREA NETWORK SUCH AS THE INTERNET

FIELD OF THE INVENTION

The present invention relates generally to computer networking, and to coupling a small number of computers, such as might be found in a small office, or home office, to a long haul network, such as the Internet. More specifically, the present invention relates to methods and apparatus that enable multiple devices to share an Internet Protocol (IP) address.

BACKGROUND OF THE INVENTION

The development of the Internet as a source of information, means of communication and commerce, is burgeoning. Electronic mail (e-mail) provides a form of communication similar to, but much faster than, the a letter. The rapidly expanding World Wide Web (WWW) component of the Internet now enables a company to advertise its services and products to potential customers anywhere in the world. And students and professionals may access online versions of government documents, such as the Constitution.

While Internet access is relatively easy to acquire and set up for a single computer or single individual, there is currently no way to concurrently share a single connection. For example, multiple people may simultaneously require access to the Internet from multiple computers, such as several employees in a single office, or multiple school age children in a family. Providing such simultaneous Internet access from multiple computers may be prohibitively expensive. Because in most instances users access the Internet using a modem to call an Internet Service Provider (ISP), multiple modems, telephone lines, and ISP accounts may be an required at significant expense.

Furthermore, many ISP's limit customers to a single dial-up connection at a time, so that multiple accounts are required to provide simultaneous access. Indeed, some ISP's presume an account has been compromised if accessed from more than one dial-up connection at the same time, and block the account for security reasons. If more than a few users require access, the logistical difficulty of coordinating the usage of multiple accounts may be overly cumbersome and error prone.

Another disadvantage of dial-up Internet access is the fact that the user's computers are inaccessible unless the dial-up link has already been established. This makes it difficult or impossible to connect to a user's computer from a remote location. For example, a business traveler who failed to anticipate that a specific computer file would be needed cannot generally retrieve the file from an office computer, unless the computer containing the file is equipped with a modem. If, as is typical, the office computer is connected to a Local Area Network (LAN) having a shared modem, the specific computer containing the file will be inaccessible.

In addition to retrieving files from a remote computer, it may also be desirable to access other devices and peripherals from a remote location. For example, the output of a laser printer is far superior to that of a facsimile machine. Therefore, it would be desirable to have the capability to print a file directly to a remote laser printer, rather than print the document and have it sent by facsimile to the remote location.

In view of the foregoing, it would be desirable to provide methods and apparatus for connecting multiple computers to the Internet through a shared connection.

It also would be desirable to provide methods and apparatus that enable multiple computers to simultaneously access the Internet using a single IP address.

It further would be desirable to provide methods and apparatus for providing remote access to peripherals and other resources.

SUMMARY OF THE INVENTION

In view of the foregoing, it is an object of the present invention to provide methods and apparatus for connecting multiple computers to the Internet through a shared connection.

It is also an object of this invention to provide methods and apparatus that enable multiple computers to simultaneously access the Internet using a single IP address.

It is a further object of the present invention to provide methods and apparatus for providing remote access to peripherals and other resources.

These and other objects of the invention are provided by a computer programmed to serve as an interface, or gateway, to the Internet, and to permit sharing of the Internet connection. In accordance with the methods of the present invention, the gateway computer, which may be connected to several computers on a LAN, and to the Internet via a dial-up modem, acts as the recipient of all communications directed to computers on the LAN.

Unlike previously known bridges and routers, however, the gateway computer of the present invention modifies the source fields of data packets received from the LAN, and the destination fields of data packets received from the Internet, so that several computers may simultaneously share the single IP address of the gateway computer. Specifically, the gateway computer is programmed to edit outgoing data packets so that the interface computer appears to be the packet's originator, and so the incoming data packets are directed to predetermined computers connected to the LAN. State information about each communication is kept, to aid correlating reply data to the proper recipient.

In accordance with another aspect of the invention, software programmed on an ISP computer may initiate a connection to the gateway computer, on an as-needed basis, to service HyperText Transport Protocol (HTTP) requests, forward e-mail, and the like. Using caller ID, the gateway computer may recognize a call placed from the ISP computer, and call the ISP computer back. Thus, the user, and not the ISP is charged for the telephone call.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
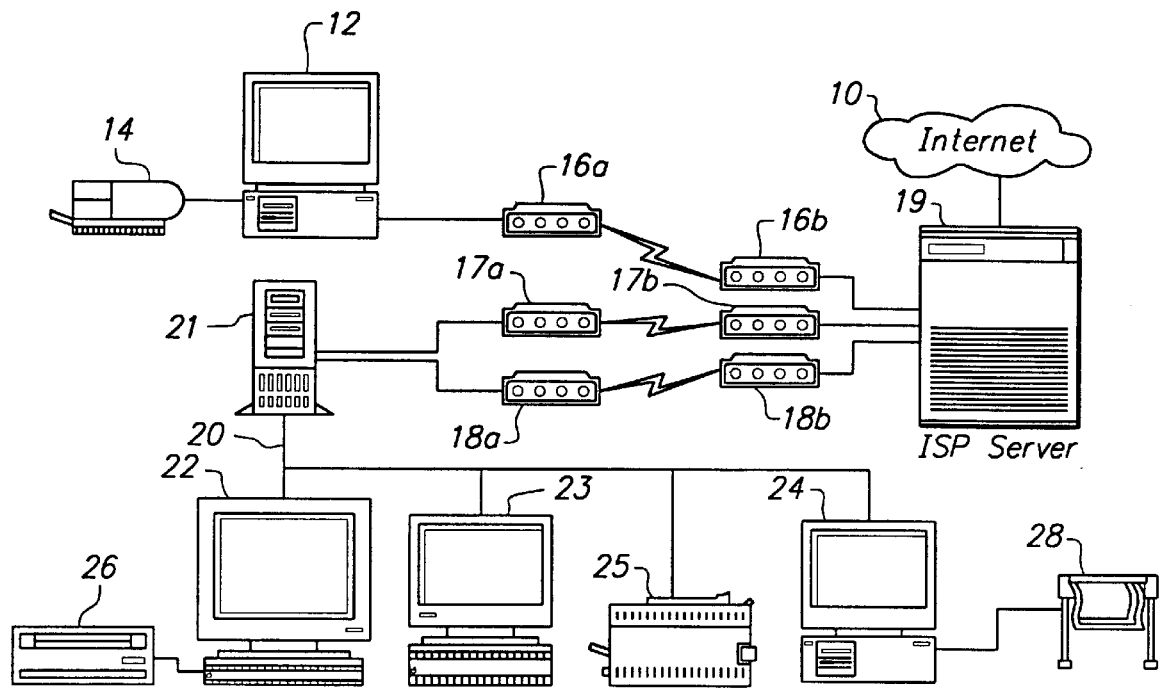
FIG. 1 is a block diagram showing typical arrangements by which computers are coupled to the Internet, suitable for use in implementing the methods and apparatus of the present invention.

The present invention is directed to methods and apparatus for sharing a single Internet Protocol (IP) address with several computers connected to a Local Area Network (LAN) or several peripheral devices connected to a single computer. In either instance, one of the computers on the LAN, or the single computer, is programmed to serve as a gateway computer that interfaces with the Internet. The gateway computer modifies all outgoing data packets to the Internet to appear as if originating from the gateway computer, and provides a destination port for all communications received from the Internet to appear as if destined for the gateway computer. When data packets are received from the Internet by the gateway computer, the gateway computer consults a database table to look up the internal LAN address of the originating computer (or peripheral port address of a specified peripheral), and forwards the data packet accordingly.

The following description first briefly discusses in section A the structure of the Internet, and the function of devices such as "bridges" and "routers" in wide area networks. Section B of the description describes typical protocols employed in Internet communication, to provide the background necessary to understand implementation of the methods and apparatus of the present invention. The methods and apparatus of the present invention are then described and illustrated.

A. The Internet Structure

A computer network is simply a collection of interconnected computers. When the computers are located in a relatively small geographic area such as an office, building, home, or campus, the network is called a Local Area Network (LAN). When the interconnected computers are dispersed over a geographically larger area, such as a city, state, country, or the world, the network is referred to as a Wide Area Network (WAN).

To a casual observer, the Internet might appear to be a single giant computer network. However, the Internet is in fact a heterogeneous collection of many computer networks interconnected by devices, such as "bridges" and "routers", that enable computers on one network to communicate with computers on other networks.

A "bridge" simply receives a packet on one network and rebroadcasts the packet to all other networks to which the bridge is connected. Typically, a bridge performs little or no analysis or processing of packet contents. The bridge may, however, keep track of the computers on each network to which the bridge is connected (i.e., by either hardware or IP addresses). A bridge with this information may then discard packets received from the same network to which the packet's destination is attached, thereby improving network efficiency by reducing network traffic.

A "router" is similar to a bridge in that it may interconnect multiple networks. However, unlike a bridge, a router is more selective about which packets are forwarded, and about the network on which the packets are forwarded. In particular, a router uses the destination address of the packet to lookup a route to the destination, and forwards the packet only if an efficient route to the destination is found.

Many computers are connected to the Internet on an intermittent basis though the use of modems and a dial-up account with an ISP. Two exemplary modem connections are shown in FIG. 1, wherein computer 12 is attached to printer 14 and modem 16a. Under the control of software on computer 12, modem 16a, which may be an internal or external modem, places a telephone call to, and establishes a data communications link with, modem 16b, which in turn is connected to ISP server 19.

Also shown in FIG. 1 is exemplary small office LAN 20, interconnecting computers 21–24. Some peripheral devices, such as printer 25, are connected directly to LAN 20, whereas other peripheral devices are connected indirectly, such as optical disk jukebox 26 and plotter 28, which are connected to LAN 20 via computers 22 and 24, respectively. A pool of modems, including modems 17a and 18a, are coupled to computer 21 which is programmed to function as a communication server.

A computer on LAN 20 needing access to a modem, sends a modem request to communication server 21. If a modem is available, communication server 21 assigns one of modems 17a and 18a, to the requesting computer, and attempts to establish a connection with one of modems 17b or 18b. After a connection is established, packets sent to communication server 21 from the requesting computer are transmitted to ISP server 19 via the assigned modem. In the event all modems in the modem pool are in use, the modem request is not fulfilled, and the requesting computer is unable to communicate over the Internet.

ISP server 19, acting as a bridge, or router, receives packets sent from computers 12 and 21, and forwards them to Internet 10 based on information in the packet as described below. Similarly, packets received by ISP server 19 from Internet 10 are analyzed, and forwarded to one of computers 12, 22, 23, or 24 as appropriate. For example, packets addressed to computer 12 are forwarded to computer 12 by way of modems 16a and 16b, whereas packets addressed to any of computers 21–24 are forwarded to computer 21 by way of modems 17a and 17b or 18a and 18b.

B. Internet Addressing Protocols

Data is transmitted from point-to-point within the Internet in accordance with certain well defined protocols. Two of the most common protocols used on the Internet are the Internet Protocol (IP) and the Transmission Control Protocol (TCP), often referred to together as TCP/IP. Most communication tasks performed between two computers connected by the Internet use these protocols, either directly or indirectly. For example, the HyperText Transport Protocol (HTTP), which forms the basis of the World Wide Web (WWW), uses TCP/IP as the underlying protocol for retrieving web pages from another computer.

Figure 2:
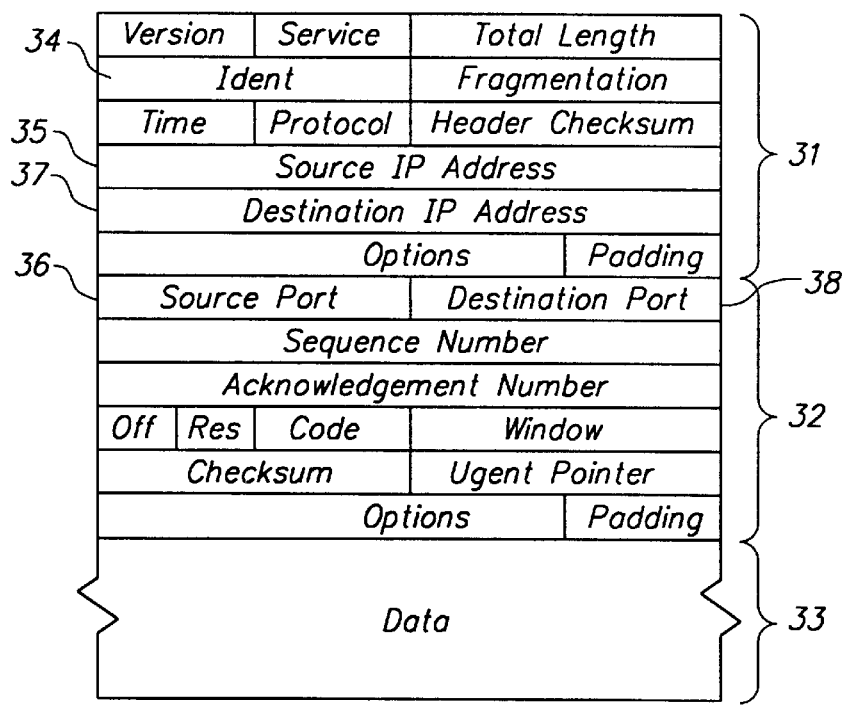
FIG. 2 is a block diagram illustrating the structure of a typical previously known data packet transmitted over the Internet.

Referring to FIG. 2, the structure of exemplary IP datagram 30 is described. Conceptually, data to be transmitted in accordance with the TCP protocol is first encapsulated in a "TCP packet," which in turn is encapsulated in an "IP datagram." Thus, IP datagram 30 includes IP header 31, followed TCP header 32, and user data 33. IP datagram 30 includes a number of fields that are used in the process of transmitting data from one computer to another. Of the fields in IP datagram 30, source IP address field 35, source port field 36, destination IP address field 37 and destination port field 38 are germane to the present invention, and will be discussed in more detail hereinbelow. Additional information on the other fields in IP datagram 30 may be found in Standard Document 5 (STD 5), available through the InterNic, at http://www.internic.net/, or in *TCP/IP Illustrated, Volume* 1: *The Protocols,* W. Richard Stevens, Addison-Wesley, 1994.

IP source address field 35 and destination field 37 of IP header 31 contain the IP address of the sender and destination of IP datagram 30, respectively. More specifically, an IP address identifies an interface through which a computer connects to an IP based network such as the Internet. Each interface must have a IP address that is different and unique from the IP address of any other interface reachable by that network. Thus, while interfaces on two isolated networks may have the same IP address, no two interfaces connected to the Internet may have the same IP address. Although a computer may have multiple interfaces and hence multiple IP addresses (e.g., a bridge has at least one interface for each network to which it is connected), each interface is associated with one computer, so effectively, an IP address uniquely identifies a computer. For this reason, computers are said to have "IP addresses".

To ensure that interfaces have unique IP addresses, the addresses are carefully managed. The address space is subdivided into blocks of addresses which are assigned to network carriers, who assume responsibility for assigning addresses from within their block of addresses. The network carriers in turn subdivide their blocks of addresses and assign blocks of addresses to Internet Service Providers (ISP), who in turn subdivide and assign IP addresses to their clients, and so on. The allocation of IP addresses in this manner provides a means of routing IP datagrams, without the source computer knowing of a path to the destination computer.

IP addresses have a logical structure related to the hierarchical manner in which IP addresses are allocated. This enables an IP datagram to be routed to the destination computer, even though the source computer may not know a specific path or route to the destination. In much the same way a postal address includes state, city, and street information, an IP address includes information identifying a network, sub-network, and host interface. Specifically, successive portions of an IP address identify successively lower networks in the network hierarchy, and the last few bits identify a particular computer. This structuring of an IP address is known as "subnet addressing," and provides that a first portion of an IP address identifies a network to which a particular computer is attached, additional portions identify sub-networks, and a last portion of the address identifies a specific computer.

An IP address is typically a 32 bit number, conventionally written as the decimal value of each byte of the address separated by periods, or "dots". For example:

179.34.20.24 is the conventional notation for the following IP address:

10110011 00100010 00010100 00011000.

Using subnet addressing, this address may refer to computer "24", located on sub-subnet "20", attached to subnet "34", on network "179". Although the subnet portions of this hypothetical address are each 8-bits wide, this need not be the case.

As described in section A above, a router is a computer connected between two or more networks, that forwards received packets in the direction of their destination. To enable a router to perform this task, each router exchanges information with neighboring routers, identifying the computers and networks to which each router is connected, and to advertise known routes to distant networks. When an IP datagram is received, the router uses a portion of the destination IP address as an entry into a routing table, and forwards the IP datagram (or synonymously hereinafter, packet) accordingly.

The routing tables also typically have a default destination for packets having an unknown destination network. Usually, the default destination is another router higher up in the hierarchy of networks, which is presumably more likely to know a route to the destination. In the event the higher router also does not know of a route to the destination network, it too may forward the packet to a router still higher in the network hierarchy. Assuming the destination is reachable, a route to the destination, or at least the destination network is found, and the packet is transmitted accordingly.

Figure 3:
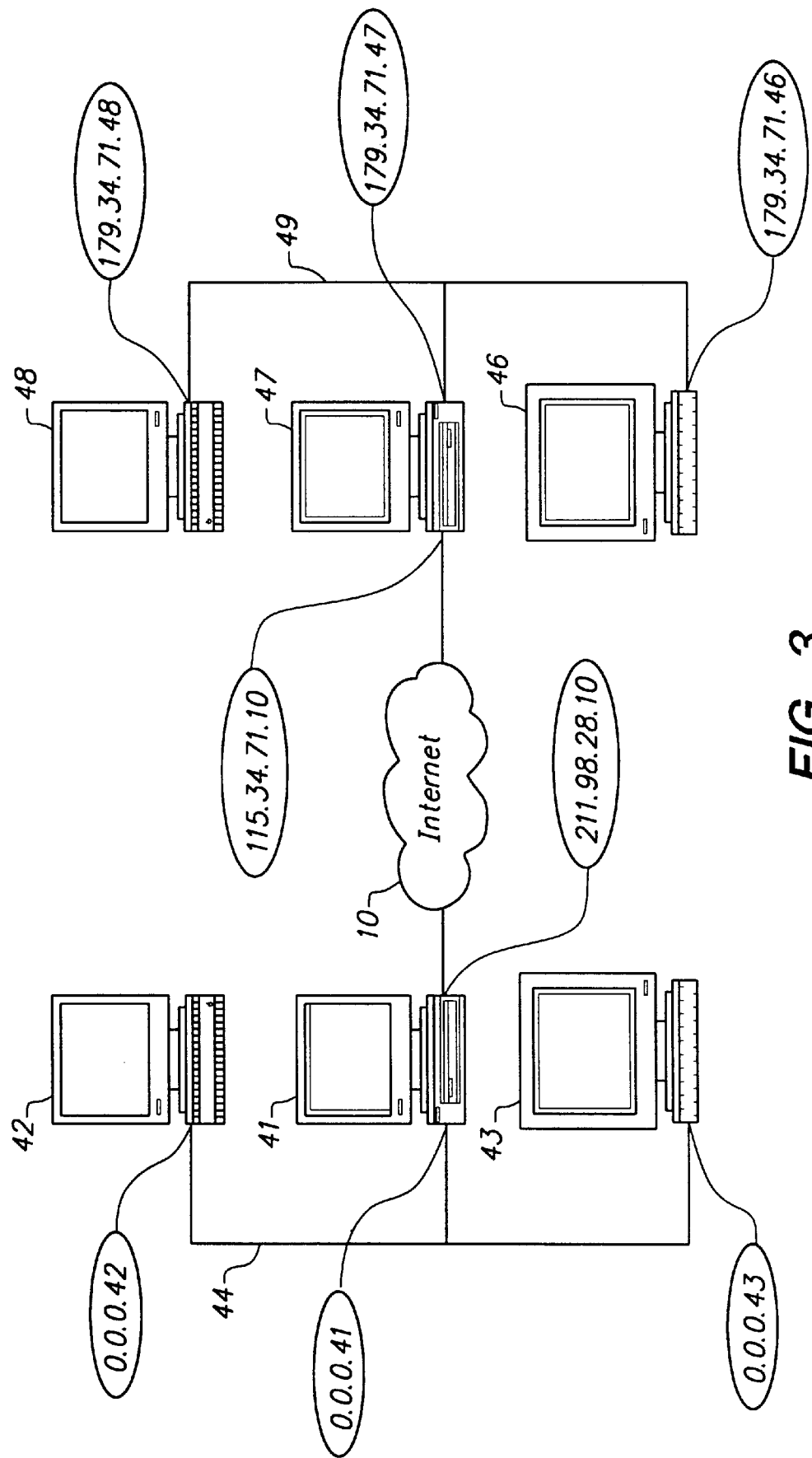
FIG. 3 is a block diagram showing two small networks of computers connected to the Internet, suitable for use in implementing the methods and apparatus of the present invention.

Referring now to FIG. 3 (wherein the modems have been omitted for clarity), computer 41 connected to Internet 10 may transmit data to computer 46 by specifying its IP address (e.g., 179.34.71.46) in destination IP address field 37 of IP datagram 30 (see FIG. 2). The packet is transmitted through Internet 10, passing from router to router until eventually reaching gateway computer 47 connected to subnet 49. Gateway 47 then sends the packet to computer 46.

As described above, TCP is another common protocol used on the Internet. TCP runs on "top of" the IP protocol, in that TCP uses IP for routing a TCP packet to a destination computer. TCP builds on basic IP delivery to enhance reliability, and also includes the concept of using communication ports to identify processes running on the sending and receiving computers.

Referring still to FIGS. 2 and 3, TCP header 32 of IP datagram 30 includes fields 36 and 38 for identifying, respectively, the source and destination ports being used by the respective computers for TCP communication. Modern computer operating systems enable multiple processes, or programs, to be running concurrently. When a process needs to communicate with another computer using TCP/IP, it is allocated a unique port number. Different processes have different ports, and a port number, therefore, identifies the process sending or receiving a packet. The source and destination ports ensure that the data packets are delivered to the correct recipient on the destination computer. This is analogous to including the recipient's name on an envelope to distinguish a specific person from among multiple residents at a postal address.

As indicated by the oval-shaped indicators in FIG. 3, computers 46, 47, and 48, which are connected together by LAN 49 (also referred to as a subnet), are each assigned a unique IP address. For example, computer 46 has an IP address of 179.34.71.46. Gateway computer 47 serves as an interface between Internet 10 and subnet 49. In other words, all packets having an destination IP address of the form 179.34.71.X, where "X" means "logically don't care" (i.e., it does not matter what the value is), are accepted by gateway computer 47. LAN 49, therefore, actually occupies 256 IP addresses—179.34.71.0 through 179.34.71.255—wasting 253 of them. Although allotting extra IP addresses to accommodate future growth is often desirable, the number of valid IP addresses is limited, and preferably should not be wasted. It is this shortcoming of previously known addressing schemes which the present invention exploits to provide new functionality not heretofore attainable.

C. The Present Invention

Referring still to FIG. 3, computers 41, 42, and 43 connected to LAN 44 in accordance with the principles of the present invention. Gateway computer 41 is given an IP address which has been assigned by a ISP, and may therefore communicate with other computers on the Internet. However, in accordance with the principles of the present invention, and unlike previously known gateway computer 47, gateway computer 41 of the present invention is only assigned a single IP address, e.g., 211.99.28.10, rather than a block of 256 addresses.

Further in accordance with the present invention, the other computers connected to LAN 44, computers 42 and 43, do not have IP addresses assigned by an ISP or other Internet addressing authority. Instead, computers 42 and 43 are arbitrarily assigned IP addresses by the administrator of LAN 44. For example, computer 42 is shown to have an IP address 1.2.3.42. Although, any address may be assigned, it may be advantageous to use a address having a network field that refers to "this" network, i.e., the network to which the computer is attached.

Because the IP addresses for computers 42 and 43 are not assigned by an authorized issuer, these addresses may conflict with IP addresses assigned to other computers elsewhere on the Internet. Accordingly, gateway computer 41 is programmed to serve as a substitute for computers 42 and 43 when communicating with other computers via the Internet. In this way, computers 42 and 43 do not communicate directly with Internet 10, and no conflict arising from the use of non-unique IP addresses occurs.

In accordance with the methods of the present invention, routing software on gateway computer 41 examines the IP header (and TCP or other protocol headers) of packets received from computers 42 and 43. On those packets bound for computers located on the Internet, the software substitutes the IP address of gateway 41 for that of computers 42 and 43 in source IP address field 35 of IP datagram 30. Gateway computer 41 may also replace the source port number in field 36. When a reply, such as an acknowledgment, to the modified packet is received, the software restores the IP address and port number before forwarding the packet to the original sender.

A gateway computer suitable for practicing the present invention includes a computer programmed in accordance with the methods of the present invention, and may be an IBM-compatible or similar type personal computer (e.g., such as sold by Apple Computers, Inc.), or a server-type computer commonly used for LANs. Alternatively, the gateway computer may comprise a peripheral having a network interface, dial-up or other type of modem, a microprocessor, and memory suitable for implementing the methods and storing and memory structures described hereinbelow.

Figure 4:
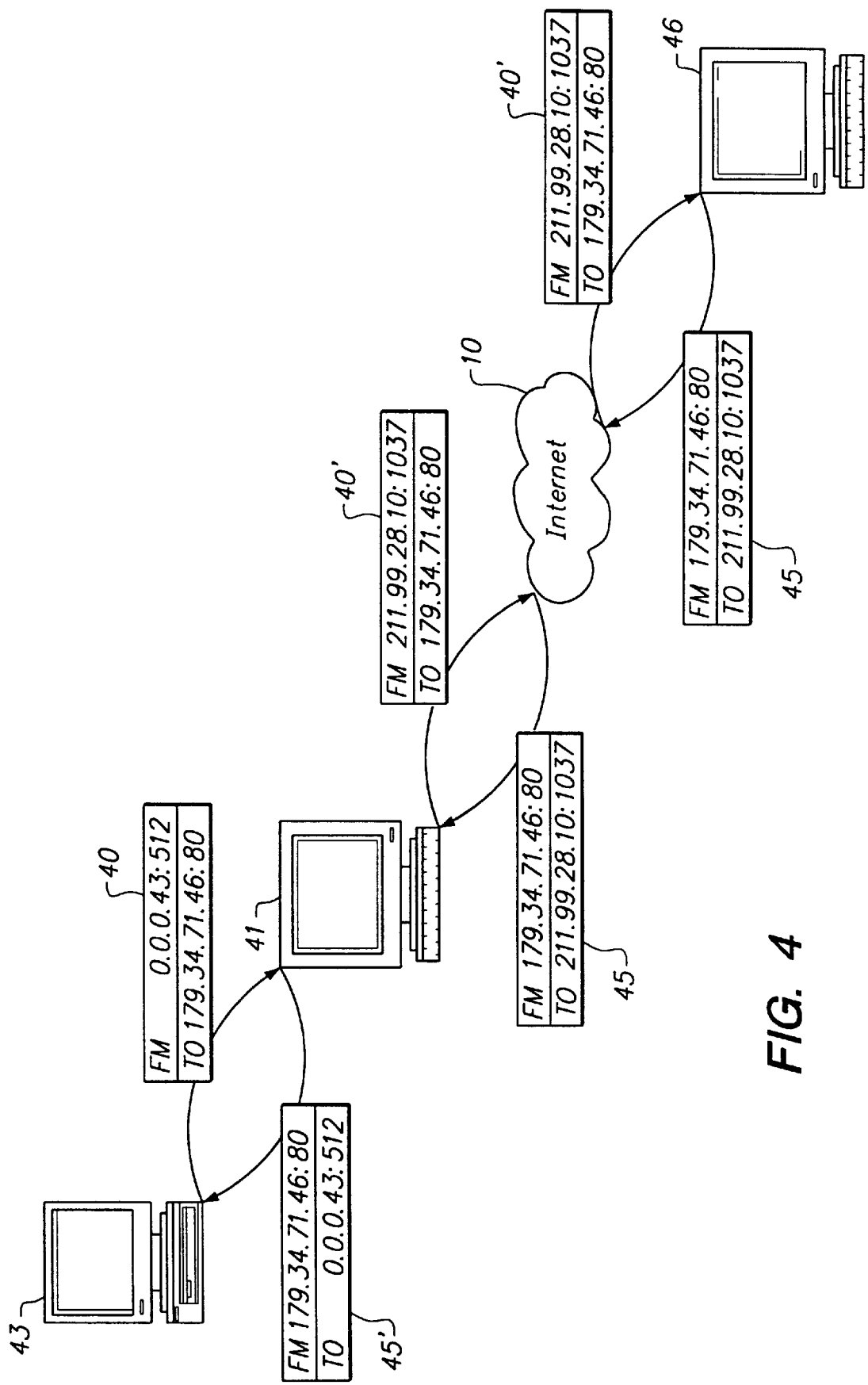
FIG. 4 is a block diagram illustrating how TCP/IP packets may be modified while being routed through the Internet in accordance with the present invention.

The methods of the present invention are further illustrated in FIG. 4, where, for reasons of clarity, only the IP address and port number fields in packets 40 and 45 are described. FIG. 4 illustrates communication between computers 43 and 46 via the Internet 10, for example, to retrieve a portion of an HTTP request for loading a WWW page. Computer 43 first assembles packet 40, which includes the IP address and port number of destination computer 46, e.g., 179.34.71.46:80, as well as its own source IP address and port number, e.g. 1.2.3.43:512. Because there is no direct connection between computer 43 and the Internet, packet 40 is routed on LAN 44 to gateway computer 41.

Routing software on gateway computer 41 records the source IP address and port number, e.g., 1.2.3.43:512, and substitutes its own source IP address and a selected port number, e.g., 211.99.28.10:1037, into packet 40 to create packet 40'. The correspondence between the source IP address and source port number of computer 43, as well as a selected destination port number on gateway computer 41, are recorded in a table or database located on, or accessible to, gateway computer 41. Gateway computer 41 then forwards modified data packet 40' toward the original destination, possibly via additional gateways and routers, not shown in FIG. 4, until packet 40' reaches computer 46.

If packet 40 (and hence 40') employs the TCP protocol, packet 40' is expressly acknowledged by computer 46 upon receipt. Specifically, when computer 46 receives packet 40', it notes the source IP address and port number, and creates a packet acknowledging receipt. The packet, which may also contain data, is addressed to the apparent sender, i.e., gateway computer 41, and transmitted to Internet 10. Eventually, reply packet 45 is received by gateway computer 41.

Gateway 41 in turn looks up the destination port number, e.g., 1037 in packet 45, in the table recorded above, and extracts the true destination computer and port, e.g., 1.2.3.43:512 for computer 43. Gateway computer 41 then inserts the extracted address information into destination address and port fields 37 and 38 of packet 45 to create packet 45', and forwards package 45' to computer 43 on LAN 44.

Figure 5A:
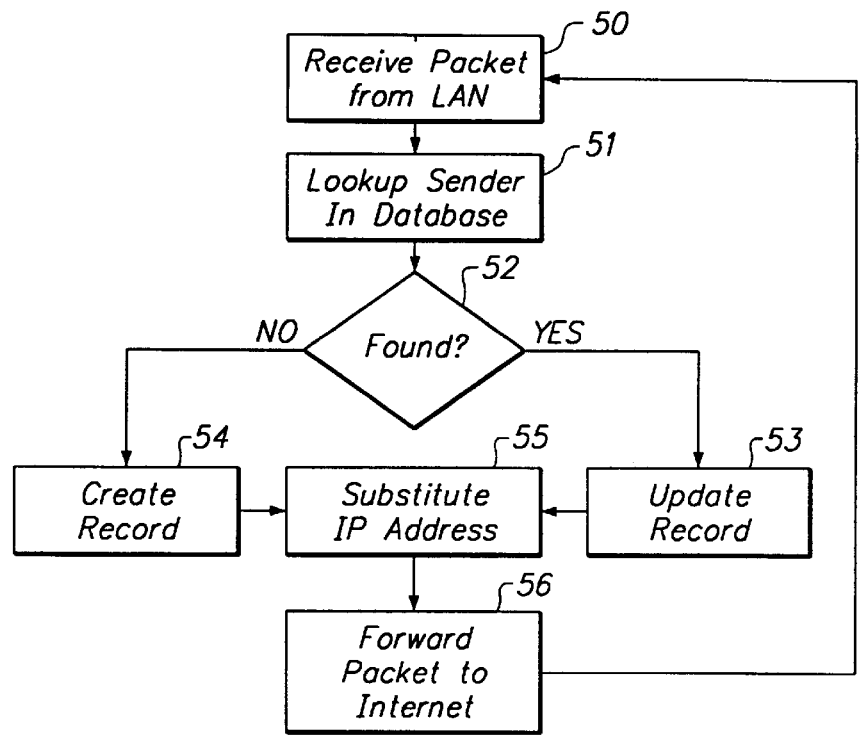
FIGS. 5A and 5B, are flowcharts of exemplary programs for processing, respectively, packets received from a LAN and replies received from the Internet.
Figure 5B:
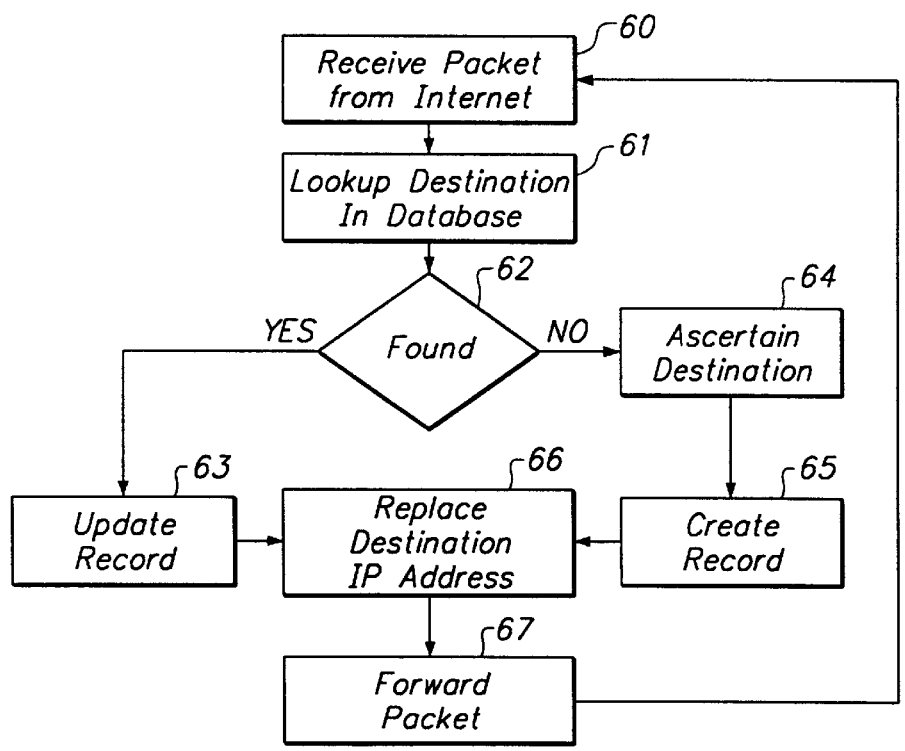

Referring now to the flowcharts of FIGS. 5A and 5B, the foregoing process is described in further detail. At block 50, gateway computer 41 waits to receive an outgoing data packet. Upon receipt of a packet having a non-local IP address (i.e., the destination is not on LAN 44), the identity of the packet's sender and destination are used to access a database at block 51. The database entry may contain, for example, the assigned port number on the gateway computer referenced against the source IP address and port number and the destination IP address and port number. If a database entry exists, because, for example, the previously assigned port number of the gateway computer from the database is retrieved. The source IP address and port number of gateway computer 41 are then substituted into the respective source fields of the packet.

By way of illustration, if in FIG. 4 gateway computer 41 receives packet 40 from computer 43 having a source IP address and source port number of 1.2.3.43:512 and a destination address and port number of 179.34.71.46:80, those IP addresses and port numbers are used to access the database, and extract the previously assigned destination port number 1037 of gateway computer 41. The IP address of gateway computer 41 and the retrieved port number, e.g., 211.99.28.10:1037, are then substituted into packet 40 in place of the source IP address and source port number in fields 35 and 36, respectively, to create packet 40'.

In addition to retrieving the substitute addressing information, the computer may also update the database record with other information that might be helpful in correlating packets received from Internet 10 with their proper destination. For example, IP datagram 30 of FIG. 2 includes an identification (Ident) field 34. Ident field 34 is a unique 16-bit number that is assigned to each packet, and must be unique for each combination of source-destination-protocol. In practice, many IP implementations simply copy the value of a 16 bit counter into Ident field 34, and then increment the counter. As a result, there is likely a strong correlation between the Ident field of a first packet and a subsequent packet in a specific combination of source-destination-protocol. Keeping track of this type of information may aid gateway computer 41 in correlating packets received from the Internet to their intended destination, particularly if protocols other than TCP are used.

Alternatively, if the search of the database fails to find a record matching the source IP address and port number in decision block 52, a new database record is created including the source and destination IP addresses and port numbers and an arbitrarily assigned port number on gateway computer 41. The IP address of gateway computer 41 and the arbitrarily assigned port number are then substituted into source IP address and source port fields 35 and 36, respectively, at block 55. The modified packet is then forwarded onto the Internet in block 56, as described hereinabove.

On receipt of a packet from Internet 10, the process outlined by the flowchart of FIG. 5B is performed on gateway computer 41. A packet received in block 60 is analyzed to determine the destination IP address and port number. This information is used in block 61 to enter the database constructed in block 54 of the flowchart of FIG. 5A, described previously. If the table lookup is successful at decision block 62, the destination IP address and destination port number of the originating computer are retrieved from the database record. At block 63 the table record is updated with information from the packet header. The retrieved IP address and port are substituted into the destination fields of the packet header at block 66, and at block 67 the packet is forwarded on LAN 44 to its destination.

If, however, the database search fails at decision block 62, other techniques may be used to try and identify the intended destination of the packet. For example, a computer on Internet 10, may have e-mail to send to one of the computers attached to LAN 44. In this case, gateway computer 41 may be programmed to look at the header of the e-mail message itself to ascertain the correct destination. If the e-mail is addressed to "j_q_public@somewhere.com," gateway computer 41 may examine a list of users to locate j_q_public's computer and forward the e-mail to, for example, computer 42.

Analogously, an HTTP request may be received for a document located on one of the computers on LAN 44. The advent of the World Wide Web has standardized naming of resources on the Internet through the use of Uniform Resource Locators (URLs), sometimes referred to as a Uniform Resource Name (URNs). A URL has the form protocol://host-name[:port]/[path]

wherein protocol specifies the protocol used to communicate with the resource host-name identifies the computer hosting the resource (this is translated to an IP address)

[port] is a port number, and

[path] identifies the path to the resource on the specified host, where [] indicates a field is optional. In accordance with the present invention, the "port" and/or "path" portions of a URL may be used to identify one of the computers on LAN 44. For example, the port field may be used to identify a particular computer. Alternatively, a first portion of the path may be based on the name of a user publishing a web page so that gateway computer 41 may forward an HTTP request to that user's computer.

Figure 6:
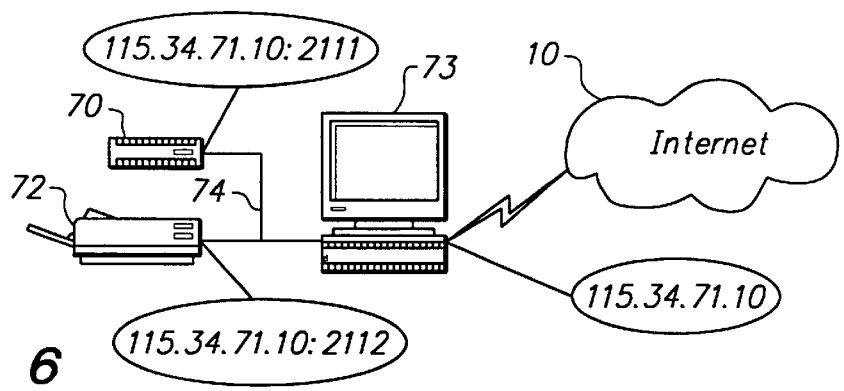
FIG. 6 is a block diagram showing computers, peripherals, and other devices assigned port numbers so that they may be accessed remotely in accordance with another aspect of the present invention.

Referring now to FIGS. 3 and 6, each of the computers 41–43 connected to LAN 44 is assigned a local IP address. In accordance with the present invention, devices, such as computers and computer peripherals may also be assigned unique numbers, corresponding to port numbers on the gateway computer. For example, in FIG. 6, CD-ROM jukebox 70 may be assigned port 2111, while laser printer 72 may be assigned port 2112. Furthermore, computer 73 may be programmed to serve as a gateway computer, in accordance with the above-described methods, to recognize packets having a destination port of either 2111 or 2112 as being destined for CD jukebox 70 and laser printer 72, respectively, and accordingly route the packet to one of those devices. Alternatively, gateway computer 73 may send the packet to a process that handles the details of interfacing with the requested device. For example, a packet addressed to port 2112 may be routed to a print queue that handles print requests for laser printer 72, rather than directly to laser printer 72.

The foregoing addressing technique may be further extended to computers and storage devices on the network. Assignment of IP addresses and port numbers to peripheral devices may be used, for example, to provide a mechanism for remotely accessing these devices. Such capability may be advantageous, for example, when a user, while traveling, wishes to access information located on a hard drive of his or her office computer, or may want to print a document to a printer in a client's office. For example, computer 42 in FIG. 4 may be assigned a port number, and a specific hard disk drive on computer 42 also may be assigned a port number. Thus, a remote user may access a computer or its peripherals by specifying the port number associated with the desired device.

With respect to FIG. 6, as a further example, gateway computer 73 connected to Internet 10 may direct a print job to laser printer 72 by sending the print file to the printer's IP address and port number, e.g., 115.34.71.10:2112. Gateway computer 73 in this instance is programmed to recognize address/port pairs assigned to peripheral devices and to forward the packets appropriately. For example, a packet having a destination address corresponding to laser printer 72 is interpreted as a print request and the incoming packets are routed to laser printer 72. Similarly, packets bound for port 2111 may be interpreted as requests for access to optical disk jukebox 70.

As described above, URLs have become a standard means of naming of resources on the Internet. Advantageously, since the URL format includes a field for specifying a port number, the use of URL's makes it relatively easy to access remote devices by specifying a port number.

For example, the URL:

telnet://ten.app.com:2111/file_name is interpreted as a request to access file "file_name" using the telnet protocol to contact port number 2111 on a host named ten.app.com. Assuming that the identifier "ten.app.com" corresponds to the IP address of gateway computer 73 in FIG. 6 (e.g., 115.34.71.10), the above URL is interpreted by computer 73 as a reference to the file "file_name" on optical jukebox 70.

Advantageously, the processing required to implement the methods of the present invention is performed on gateway computer 41, and is transparent to users of computers 41, 42 and 43 on LAN 44. In addition, the functions of gateway computer 41 may be readily combined with the functions of a modem server, fax server, and voice mail, to function as a complete communications server. However, these functions may also be supported by separate computers. For example, a first computer may be programed to act as a router, while a second computer is programmed to act as a modem and fax server. Alternatively, the functionality provided by the gateway computer of the present invention may instead be provided by an ISP, as a value added service. For example, in the system of FIG. 1, server 19 may be programmed to substitute IP addresses and port numbers in packets received from computer 21 bound for Internet 10, or received from Internet 10 bound for a computer on LAN 20.

In the foregoing descriptions of various preferred embodiments of the present invention, it has been assumed that a LAN, e.g., LAN 44, is connected to Internet 10 whenever a packet is to be sent between a computer on the LAN and the Internet. However, this need not be the case. Indeed, if Internet access is used relatively infrequently, it is unlikely that a connection is already established. With respect to FIG. 7, a flowchart outlining a process for establishing and accepting a connection between a gateway computer and an ISP server on an "as-needed" basis is described. In particular, FIG. 7 illustrates a process which may be performed by an ISP on, for example, ISP server 19 of FIG. 1, while FIG. 8 illustrates the complementary process executed on the gateway computer 21 to accept a connection from ISP server 19.

Figure 7:
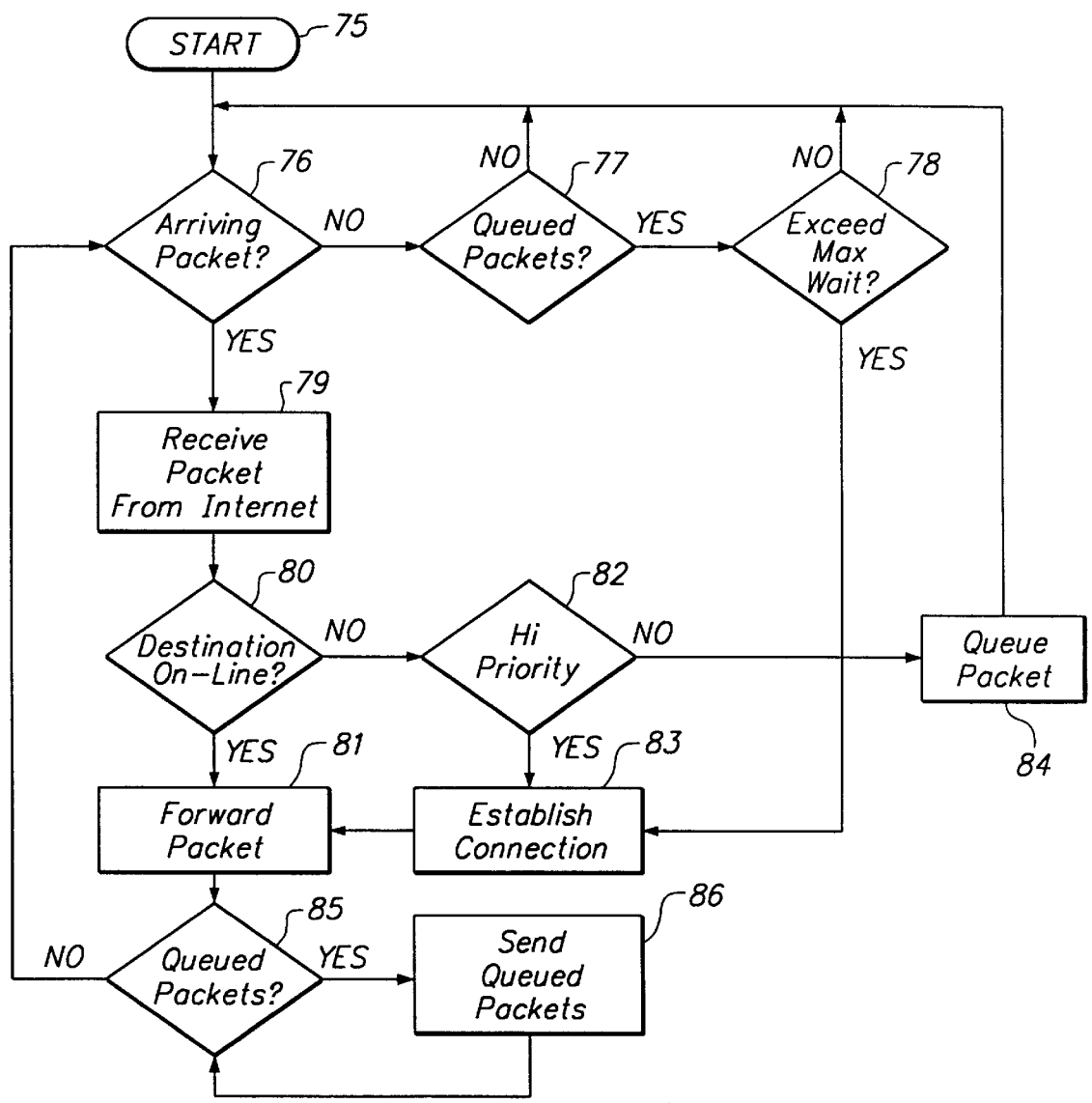
FIG. 7 is a flow chart of a program for processing unsolicited packets received from the Internet, such as electronic mail or requests for WWW pages.

With respect to FIG. 7, and starting at block 75, the process loops waiting for a packet to arrive (decision block 76) or, if any packets have been queued (decision block 77), waiting for a maximum queue time to expire (decision block 78). If a packet is arriving, it is received (block 79) and its destination determined. If already on-line with the destination (decision block 80), the packet is forwarded toward the destination (block 81); otherwise, the importance, or priority, of the packet is determined. If the priority is sufficiently high that immediate delivery is required (decision block 82), the computer establishes a connection to the destination computer (block 83), for example, by using a modem, and forwards the data packet accordingly (block 81). However, if the priority is relatively low, the packet is queued for delivery at a later time (block 84).

To minimize unreasonable delay in forwarding queued packets, a maximum queue time limit is established. If an enqueued packet has been in the queue for longer than the limit (decision block 78), a connection to the destination computer is established (block 83) and the packet forwarded (block 81). In addition, any time a connection has been established, all packets waiting in the queue for that destination are sent (decision block 85 and block 86).

Figure 8:
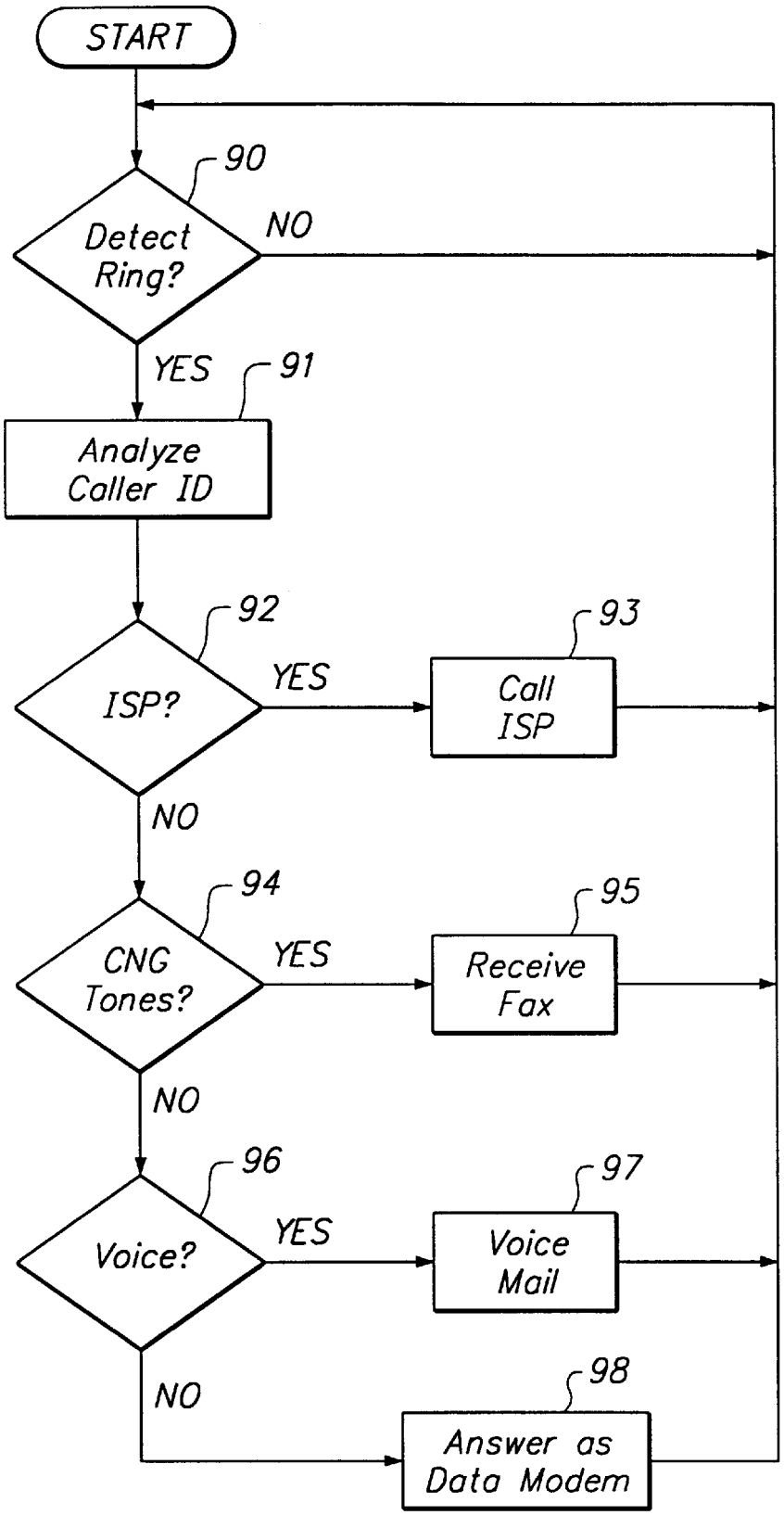
FIG. 8 is a flow chart showing the process by which an incoming call may be answered by the gateway computer of the present invention.

With respect to FIG. 8, a gateway computer, such as computer 21 of FIG. 1, waits for one of modems 17a and 18a to detect a ring signal, indicating an incoming telephone call (decision block 90). In addition to placing a ring signal on the telephone line, the telephone company may also send information, frequently referred to as "caller ID", that identifies the phone number from which the call was placed. In accordance with the principles of the present invention, gateway computer 21 reads the caller ID information, and compares it to phone numbers corresponding to ISP modems 17b and 18b (decision block 92). If the caller ID matches one of the ISP modems, then gateway computer 21 does not answer. Rather, gateway computer 21 waits until the line stops ringing and then places a call to ISP server 19 by way of one of modems 17a and 18a (block 93).

If, however, the caller ID information either does not match any of the ISP phone numbers, or the caller ID information is unavailable, the corresponding modem is commanded to "go off-hook" and pick up the line. The modem then analyzes the incoming signal for the presence of facsimile machine calling tones (CNG tones) which newer facsimile machines transmit as part of the handshaking that occurs when attempting to establish a connection with a remote facsimile machine. If CNG tones are detected (decision block 94), a facsimile transmission is received. If, CNG tones are not detected, an attempt is made to determine if the call is a voice call or an attempt to establish a modem connection. In a preferred embodiment, the gateway computer may implement a voice mail system for recording incoming messages (block 97). Otherwise, the modem answers as a modem to accept a data connection (block 98).

The skilled artisan will recognize that the invention may be practiced by other than the described embodiments. For example, the IP datagram described hereinabove with respect to FIG. 2 pertains to version 4 (IPv4) of the Internet protocol specification. To accommodate future growth of the Internet, IP version 6 (IPv6) has been developed. IPv6 extends IP addresses to 128 bits in length, and also includes rules for maintaining backward compatibility with IPv4, and for converting between 32 and 128 bit IP addresses.

An exemplary IPv6 datagram is shown in FIG. 6, and includes an IPv6 header containing the same relevant information as an Ipv4 header. It will therefore be apparent to one of ordinary skill that the principles of the present invention described hereinabove may be used advantageously employed with IPv6 by adapting the routing software so that it looks for the address/port information in the correct places in the IPv6 header.

It will be understood that implementation of the principles of the present invention are not limited to protocols such as TCP and IP. For example, the present invention may be used with the User Datagram Protocol (UDP), another common Internet protocol, which specifies headers, including port numbers, similar to a TCP header. Thus the principles of the present invention may be used in conjunction with UDP based communications as well.

One skilled in the art will thus appreciate than the described embodiments are presented for purposes of illustration and not of limitation, and that the present invention is limited only by the claims which follow.

What is claimed is:

1. A method for communicating data between a first computer and a second computer, the method comprising:
    accepting a first data packet from the first computer;
    modifying a source field in the first data packet;
    transmitting the modified first data packet to the second computer;
    accepting a second data packet from the second computer, said second data packet being an HTTP request;
    searching a table for a record correlating data in the source field of the first packet and in the destination field of the second packet;
    if said searching is unsuccessful, examining the second data packet for a Uniform Resource Locator or Uniform Resourse Name to identify a destination of the second data packet;
    modifying a destination field in the second data packet, where the destination field identifies the first computer; and
    transmitting the modified second data packet to the first computer.

2. The method as defined in claim 1 further including a step of examining a destination field of the first data packet, wherein the destination field identifies the second computer.

3. The method as defined in claim 2 wherein the first data packet is received from the first computer via a first network, the method further including a step of determining if the second computer is attached to the first network and discarding the first data packet if the second computer is attached to the first network.

4. The method as defined in claim 3 wherein the second computer is attached to a second network, and the step of transmitting the first data packet comprises transmitting the first data packet to the second computer via the second network.

5. The method as defined in claim 4 wherein the source field includes an address of the first computer, and wherein the step of modifying the source field comprises replacing the address of the first computer in the source field with the address of a third computer.

6. The method as defined in claim 5 wherein the source field includes data identifying a process on the first computer that sent the first data packet, and wherein the step of modifying comprises replacing the process identifying data with data identifying a process on the third computer.

7. The method as defined in claim 5 further comprising a step of keeping a record correlating data in the source field, data in the modified source field, and data in the destination field.

8. The method as defined in claim 7 further comprising a step of storing the record.

9. The method as defined in claim 1 wherein the destination field includes data identifying a process on the third computer, and wherein the step of modifying comprises replacing the process identifying data with data identifying a process on the first computer.

10. The method as defined in claim 9 wherein, if the step of searching is successful, the step of modifying the second data packet further comprises replacing data in the destination field with data retrieved from a record found in the step of searching.

11. Apparatus for communicating data from a first computer to a second computer, the apparatus comprising:

a gateway computer having a first interface for communicating with the first computer and a second interface for communicating with the second computer; and a processor programmed to accept a first data packet from the first computer via the first interface, modify a source field in the first data packet to form a modified first data packed, and then transmit the modified first data packet to the second computer via the second interface;

said processor is programmed to accept a second data packet from the second computer via the second interface, said second data packet being an HTTP request, modify a destination field in the second data packet to form a modified second data packet, the modified second data packet identifying the first computer, and then transmit the modified second data packet to the first computer via the first interface;

said processor is programmed to search a table for a record correlating data in the source field of the first packet and in the destination field of the second packet, and to examine the second data packet for a Uniform Resource Locator or Uniform Recourse Name to identify a destination of the second data packet if said search is unsuccessful.

12. The apparatus as defined in claim 11 wherein the processor is further programmed to examine a destination field of the first data packet that identifies the second computer.

13. The apparatus as defined in claim 12 wherein the first data packet is received from the first computer via a first network, and the processor is programmed to determine if the second computer is attached to the first network, the processor discarding the first data packet if the second computer is attached to the first network.

14. The apparatus as defined in claim 13 wherein the second computer is attached to a second network, and the processor is programmed to transmit the modified first data packet to the second computer via the second network.

15. The apparatus as defined in claim 14 wherein the source field includes an address of the first computer, and the processor is programmed to modify the source field by replacing the address of the first computer in the source field with an address of the gateway computer.

16. The apparatus as defined in claim 15 wherein the source field includes data identifying a process on the first computer that sent the first data packet, and the processor is programmed to modify the first data packet by replacing the data identifying the process on the first computer with data identifying a process on the gateway computer.

17. The apparatus as defined in claim 15 wherein the processor is programmed to keep a record correlating data in the source field of the first data packet, data in the source field of the modified data packet, and data in a destination field of the first packet.

18. The apparatus as defined in claim 17 wherein the processor is further programmed to store the record.

19. The apparatus as defined in claim 11 wherein the destination field of the second data packet includes an address of the gateway computer, and the processor is programmed to modify the destination field of the second packet by replacing the address of the gateway computer with an address of the first computer.

20. The apparatus as defined in claim 11 wherein the destination field includes data identifying a process on the gateway computer, and the processor is programmed to modify the data identifying a process in the gateway computer with data identifying a process on the first computer.

21. The apparatus as defined in claim 20 wherein the processor is programmed to replace data in the destination field of the second packet with data retrieved from a record found in the table if the search is successful.

22. A gateway for communicating data between a first computer and a second computer, comprising:

first interface for communicating with the first computer;

a second interface for communicating with the second computer; and a circuit to accept a first data packet from the first computer via the first interface, modify a source field in the first data packet to form a modified first data packed, and then transmit the modified first data packet to the second computer via the second interface;

said circuit to accept a second data packet from the second computer via the second interface, said second data packet being an HTTP request, modify a destination field in the second data packet to form a modified second data packet, the modified second data packet identifying the first computer, and then transmit the modified second data packet to the first computer via the first interface;

said circuit to search a table for a record correlating data in the source field of the first packet and in the destination field of the second packet, and to examine the second data packet for a Uniform Resource Locator or Uniform Recourse Name to identify a destination of the second data packet if said search is unsuccessful.

* * * * *